Sept. 26, 1939.                J. EDGAR                 2,173,901
                                BROACH
                          Filed Nov. 29, 1935          3 Sheets-Sheet 1
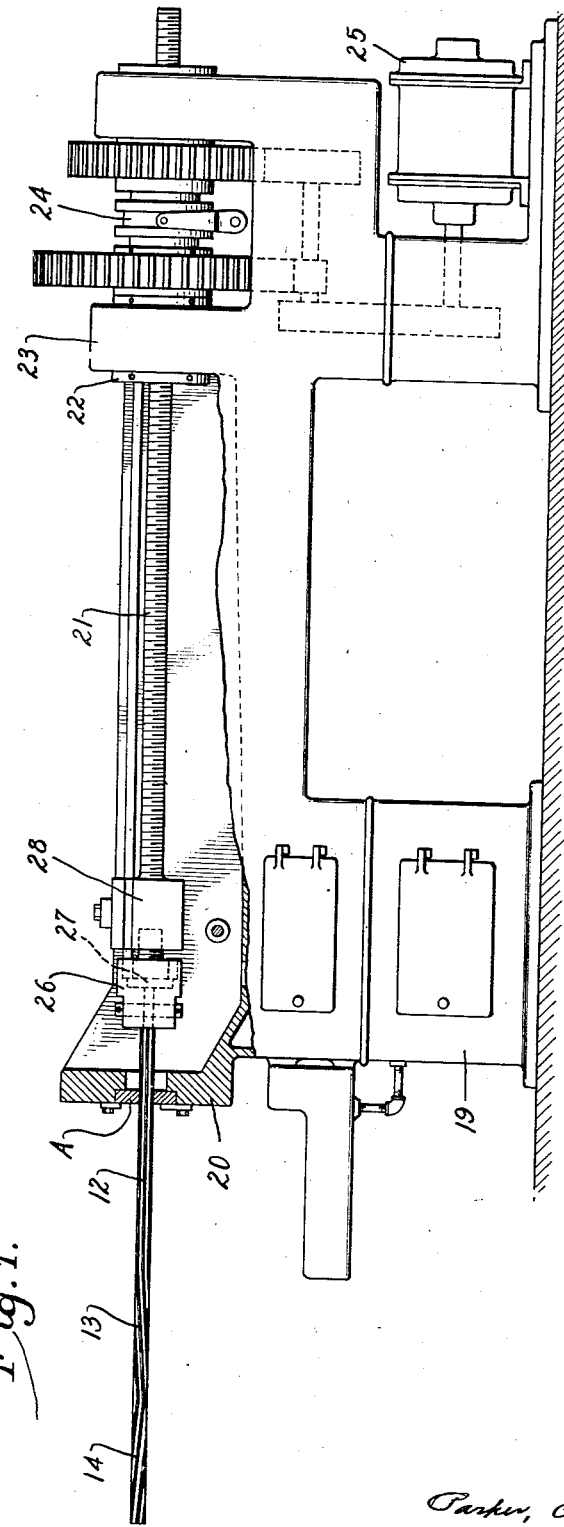
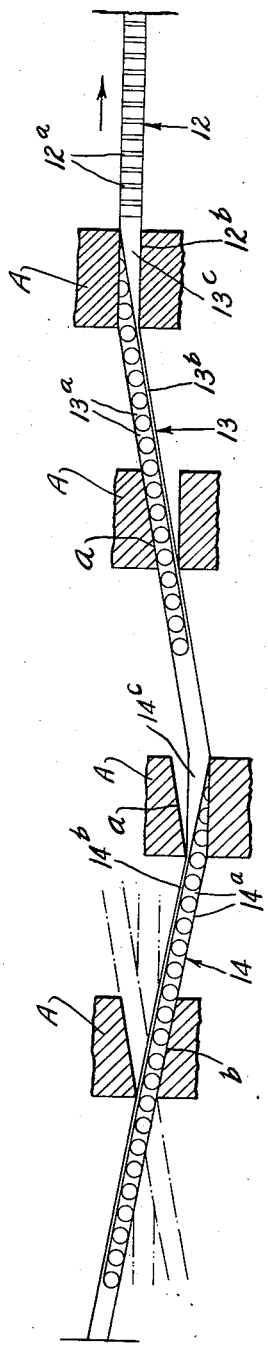
INVENTOR
John Edgar
BY
Parker, Carlson, Pitzner & Hubbard
ATTORNEYS Sept. 26, 1939.   J. EDGAR   2,173,901
BROACH
Filed Nov. 29, 1935   3 Sheets-Sheet 2
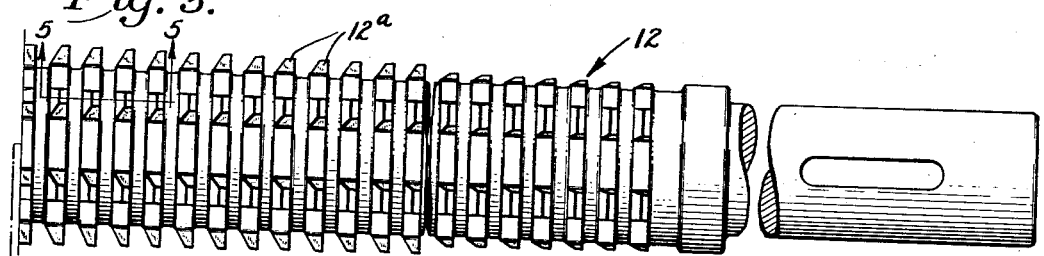
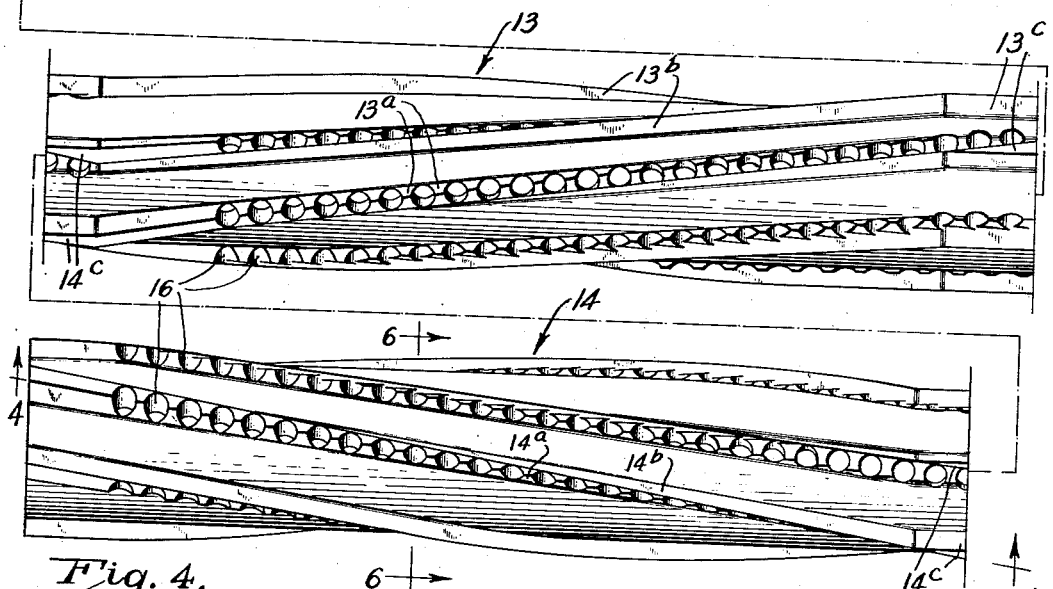
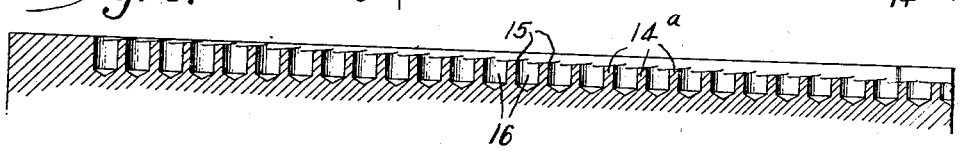
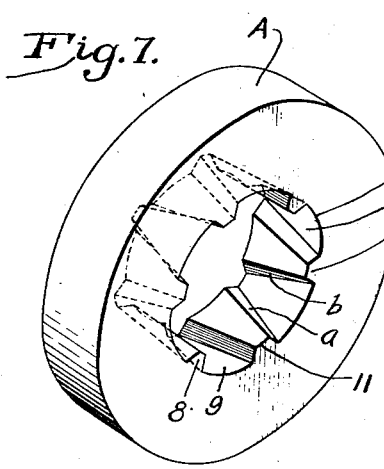
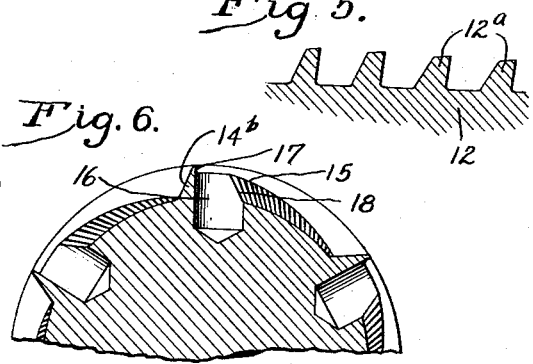
INVENTOR
John Edgar
BY
Parker, Carlson, Pitner & Hubbard
ATTORNEYS

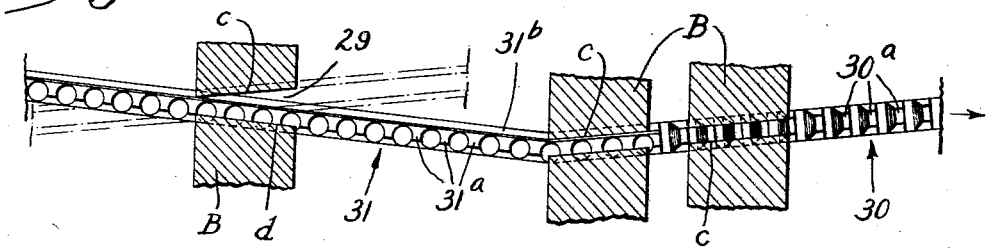
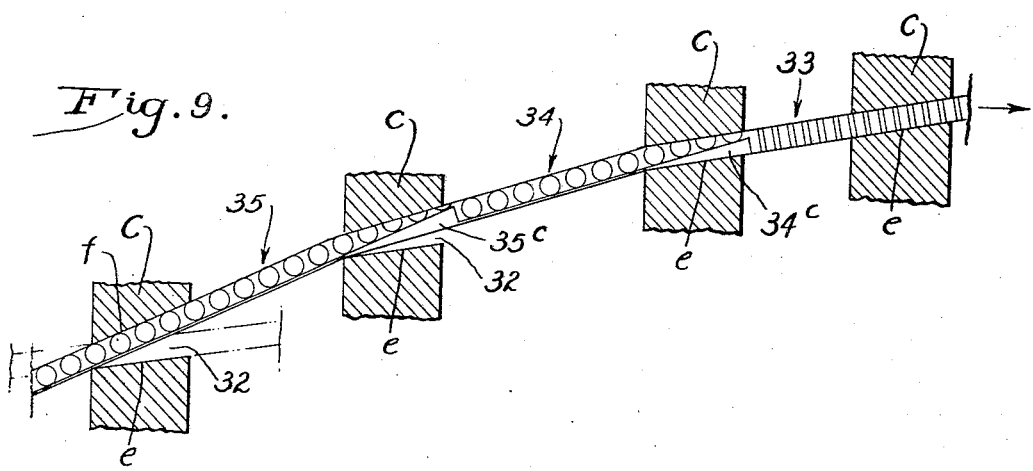
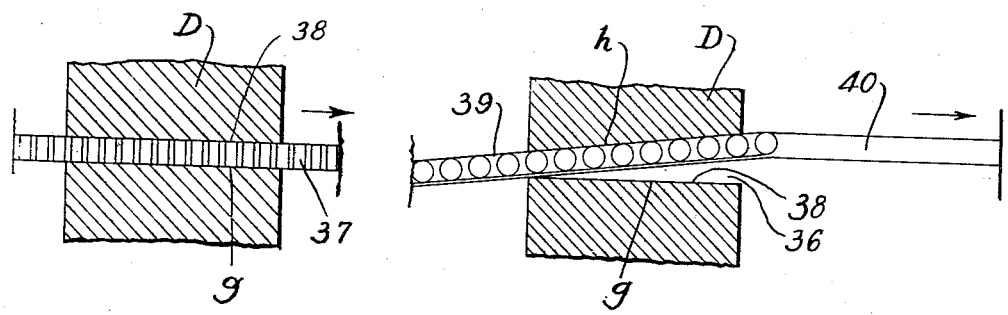

Patented Sept. 26, 1939

2,173,901

UNITED STATES PATENT OFFICE 2,173,901

BROACH

John Edgar, Rockford, Ill., assignor to Barber-Colman Company, Rockford, Ill., a corporation of Illinois Applicaion November 29, 1935, Serial No. 52,061

26 Claims. (Cl. 29—95.1)

The present invention relates to a new and improved metal cutting broach adapted for the production of keyways having spiral or helical sides.

One of the primary objects of the invention resides in the provision of a novel broach adapted successively to cut surfaces of different characteristics.

Another object is to provide a new and improved broach having longitudinally aligned sections adapted respectively in successive stages of the axial movement of the broach relative to the work to cut first straight parallel keyways and then helicoidal surfaces of a predetermined lead in one direction on one side of the keyways.

A further object resides in the provision of a novel broach having longitudinally aligned sections adapted in successive stages of the axial movement of the broach relative to the work to cut keyways first with helicoidal surfaces of a predetermined lead in one direction on one side and then with helicoidal surfaces of a similar lead in the opposite direction on the other side.

Another object is to provide a novel broach comprising in successive axial alignment a straight section, a helical section with a lead in one direction, and a helical section with a lead in the opposite direction.

A further object resides in the provision of each helical section with a guiding surface of unbroken contour opposite a series of helically arranged teeth.

Further objects reside in the provision of various modifications and alternatives adapting the broach for different forms of work pieces.

Other objects and advantages will become apparent as the description proceeds.

In the accompanying drawings,

Figure 1 is a front elevational view, partially in section, of a broaching machine having a broach embodying the features of my invention.

Fig. 2 is a diagrammatic view representing progressive stages in the broaching operation by successive sections of the broach.

Fig. 3 is a side elevational view, on an enlarged scale, of the broach.

Fig. 4 is a longitudinal sectional view taken along the helical line 4—4 of Fig. 4.

Fig. 5 is a fragmentary axial sectional view taken along line 5—5 of Fig. 3.

Fig. 6 is a transverse scetional view taken along line 6—6 of Fig. 3.

Fig. 7 is a perspective view of one form of work piece adapted to be cut by the broach.

Fig. 8 is a diagrammatic representation of a modified form of broach adapted to cut keyways with helicoidal surfaces having leads of unequal degree in opposite directions.

Fig. 9 is a diagrammatic representation of another modified form of broach adapted to cut keyways with helicoidal surfaces having leads of unequal degree in the same direction.

Fig. 10 is a diagrammatic representation of separate broach sections for cutting a keyway having a straight side and a helicoidal side.

Broaches coming within the broad aspects of the present invention, as defined by the appended claims, may be adapted for various kinds of work. However, in its preferred form, the broach is especially adapted for, and hence is disclosed in connection with, the outside member A of a wedge spline coupling of the type disclosed in my copending application Serial No. 620,449, filed July 1, 1932 (Patent No. 2,038,554).

Referring to Fig. 7, the work member A, which may constitute the hub of a gear, propeller or other part adapted to encircle an inside member (not shown), comprises a plurality of internal spline keys 8 separated by interdental keyways 9. The keys 8 extend generally longitudinally of the axis, and are uniformly peripherally spaced. In the present instance, the roots 10 of the keyways 9 and the inner faces 11 of the keys 8 are cylindrical segments, and concentric to the axis of the member A.

The keys 8 and hence the keyways 9 taper uniformly in width from end to end. One side $a$ of each keyway 9 is helicoidal in form with a predetermined lead in one direction. Preferably, the opposite side $b$ of each keyway 9 is also helicoidal in form, and has a lead of the same degree as the side $a$ but in the opposite direction. The inside member (not shown) has keys with complemental sides adapted for surface wedging engagement with the sides $a$ and $b$.

The broach (see Fig. 3) comprises an elongated body adapted to be pulled axially through the work member A, and made up of a plurality of axially aligned cutting sections 12, 13 and 14.

The leading section 12 is tapered longitudinally, and comprises a plurality of peripherally spaced series of longitudinally aligned relieved teeth 12$^a$ increasing progressively in height (see Fig. 5) and adapted to cut straight parallel keyways 12$^b$ (see Fig. 2). The width of the keyways 12$^b$ is the same as the minimum width (i. e., the width at the small ends) of the keyways 9 to be produced.

The number of series of teeth 12$^a$ is dependent on the number of keyways to be cut. For one keyway only one series of teeth would be provided. Since the work member A has six keyways 9, the broach is herein shown with six series of teeth 12ª.

The next section 13 is provided to cut the helicoidal sides *a* of the keyways 9, and has a plurality of series of helically aligned teeth 13ª with a lead in one direction. Similarly, the last section 14 is provided to cut the helicoidal sides *b*, and has a plurality of series of helically aligned teeth 14ª with a lead the same in degree as, but in a direction opposite that of, the teeth 13ª. Hence, the series of teeth 13ª and 14ª correspond in number and peripheral spacing to the teeth 12ª.

The series of teeth 13ª, being provided to cut the helicoidal sides *a*, are formed with cutting edges only at one side, and are caused to travel in a helical path through the work. Preferably, the relative rotation between the work and the broach, in timed relation to the relative axial feed, is obtained by having the non-cutting sides of the series of teeth 13ª coact with the inlet edges of the sides of the keyways 12ᵇ opposite the sides being cut. Hence, the threads defined by the teeth 13ª are the same in width as the keyways 12ᵇ, and the sides thereof opposite the cutting sides are formed with guiding surfaces 13ᵇ of uninterrupted contour. Preferably, the guiding surfaces 13ᵇ are on the leading side of the tooth thread so that they will press against the work the entire time that the section 13 is in cutting engagement therewith.

The series of teeth 14ª for cutting the helicoidal sides *b* are the same in all respects as the teeth 13ª with the exceptions that the lead of the thread is in the opposite direction, and the cutting edges are on the opposite side, while guiding surfaces 14ᵇ of uninterrupted contour are provided for engagement with the inlet edges of the sides *a*.

The series of teeth 12ª, 13ª and 14ª are so arranged that as the section 12 leaves the work, the section 13 is in proper registration with the keyways 12ᵇ, and when the section 13 leaves the work, the section 14 is in proper registration therewith. Preferably, straight pilot or guiding sections 13ᶜ and 14ᶜ are interposed respectively between the sections 12 and 13, and 13 and 14. Each of the pilot sections is substantially equal in length to the keyways 9. The pilot section 13ᶜ has uninterrupted non-cutting surfaces on one side adapted for sliding engagement with the sides of the preliminary grooves 12ᵇ opposite the teeth 13ª, and is adapted to guide the lead end of the section 13 firmly and accurately into cutting engagement with the work piece A. To obtain a greater number of teeth for a given overall length of broach, the leading teeth 13ª are formed in the other side of the guiding section 13ᶜ, and are fragmentary in character. The pilot section 14ᶜ is the same in construction as, but reversed in reference to, the section 13ª, and serves to guide the section 14 into the work.

In each of the sections 13 and 14, the teeth are tapered progressively in height (see Fig. 4) and are formed to cut only at the top outer edges 15. Also, the teeth are relieved and are separated by chip clearance spaces, preferably in the form of blind radial holes 16. These holes are of suitable depth, are tangent to the outer edges of the guide surfaces, 13ᵇ or 14ᵇ, and intersect the cutting sides of the tooth threads (see Fig. 6).

Each of the sections 13 and 14 may be made conveniently by milling a series of helical keys or splines on the broach body. In each instance, these splines would correspond in number and spacing to the tapered keyways to be cut, and would have the same transverse width and contour as the ways at their small ends. The splines for the sections 13 and 14 would have the same leads respectively as the sides *a* and *b* of the keyways. Holes, defining the chip clearance spaces 16, are now drilled in uniformly spaced relation in the splines. The holes 16 have axes offset from the axis of the broach and are of a size such that they will be tangent to the outer edges of the non-cutting sides of the splines as indicated at 17, thereby leaving these sides uninterrupted to define the guiding surfaces 13ᵇ or 14ᵇ, and will intersect the opposite or tooth sides of the splines as indicated at 18 to provide for the escape of chips. The metal in front of the first hole 16 now is milled away to the root of the splines, and in front of successive holes is milled away at progressively increasing height increments, for example of .0025 inch, until the outside diameter is reached. Now, the tops of the stepped surfaces are given a cutting rake to relieve the semicircular cutting edges defined by the trailing portions of the holes 16.

The broaching operation may be carried out in a machine (see Fig. 1) comprising an elongated base 19 on one end of which is a support 20 for the work A. A non-rotatable feed screw 21 extends axially of the work A through and in threaded engagement with a nut 22 which is rotatable in a bearing 23 on the other end of the base 19, and which is adapted to be driven in either direction through a reversing gearing 24 from a source of power 25.

The broach is connected to the free end of the screw 21 for axial movement through the work A. Relative rotary movement is imparted to the work A and the broach as the sections 13 and 14 pass through the cutting zone. Preferably, the work A is held in fixed position, and the broach is rotated. The rotation of the broach is effected and controlled through coaction of the guiding surfaces 13ᵇ or 14ᵇ with the work. Hence, the broach is secured to the end of the screw 21 by a swivel connection comprising a shell 26 to which the broach is keyed, and an inner stud 27 rotatably confined within the shell and fixed to a cross-head 28 on the screw.

The method of broaching the member A is illustrated in Fig. 2. With the member A clamped in fixed position, the broach is pulled axially therethrough. The roughing section 12 cuts the straight parallel grooves 12ᵇ (see Fig. 2). During this stage, the broach does not rotate. As the section 12 leaves the work, the pilot section 13ᶜ guides the section 13 into the grooves 12ᵇ, the guide surfaces 13ᵇ engaging the end edges of the adjacent sides of the grooves to position the teeth 13ª. In the continued axial movement of the broach, the section 13 is rotated through coaction of the guide surfaces 13ᵇ with the work, and the teeth 13ª cut the helicoidal sides *a* of the member A progressively to full depth. Upon completion of the sides *a*, the guiding section 14ᶜ directs the section 14 into the work with the guide surfaces 14ᵇ engaging the adjacent end edges of the sides *a* to position the teeth 14ª. The broach is now rotated in the reverse direction so that the sides *b* will be cut progressively to depth with a constant lead equal in degree but opposite in direction to that of the sides *a*.

While the work member A, with keyways 9 having helicoidal surfaces *a* and *b* of equal lead in opposite directions and hence defining symmetrically formed keys 8, is illustrated in detail, it is to be understood that the broach may be modified in various respects, within the scope of the invention, to cut other work members of the same general type but differing in specific form.

The three section broach illustrated in Figs. 1 to 6 is adapted to cut keyways 9 having a width at their large ends up to three times that of their small ends. Where the width at the large ends does not exceed twice that at the small ends of the keyways, the straight cutting section 12 may be eliminated, thereby resulting in a two section broach consisting of the sections 13 and 14. In this event, no preliminary straight grooves 12ᵇ are produced, and the teeth 13ᵃ are formed like the teeth 12ᵃ to cut at both sides of the tops.

Three other forms of work pieces B, C and D are diagrammatically illustrated respectively in Figs. 8, 9 and 10. The work piece B is the same in all respects as the work piece A with the exception that the opposite leads of the helicoidal sides c and d of the keyways 29 are unequal in degree and the width of the keyways at the large end does not exceed twice that at the small end. In this instance, a broach, having two sections 30 and 31, is employed first to cut a series of helical grooves having a lead equal to that desired on the sides c of the keyways 29, and then to cut the other sides d of the keyways with the desired lead in the opposite direction. Thus, the leading section 30 corresponds to the section 12, and accordingly has a plurality of peripherally spaced series of helically aligned relieved teeth 30ᵃ of progressively increasing height, with a constant lead in one direction equal to that of the sides c, and excepting for this lead similar to the teeth 12ᵃ. The trailing section 31 is like section 14, and hence has a plurality of series of helically aligned teeth 31ᵃ extending along a non-cutting guiding surface 31ᵇ and having a constant lead opposite and unequal in degree to that of the teeth 30ᵃ for cutting the sides d with the desired lead.

The work piece C has keyways 32 each of which is formed with helicoidal sides e and f having leads of unequal degree in the same direction. The width of the keyways 32 at the large ends exceeds twice but not three times that at the small ends. In all other respects, the work piece C is the same as the work pieces A and B. The broach for cutting the work piece C comprises three sections 33, 34 and 35. The leading section 33 serves to cut the helicoidal sides e with the desired lead, and excepting for the lead is like section 12. The trailing section 35 serves to cut the helicoidal sides f with the desired lead in the same direction but greater in degree than that of the sides e. Excepting for a possible difference in lead, the construction of the section 35 is the same as that of the section 14. Pilot sections 34ᶜ and 35ᶜ may be interposed respectively between broach sections 33 and 34, and 34 and 35, and each is aligned with the immediately preceding broach section.

It is to be noted that in each of the foregoing instances, two broach sections determine the final or ultimate form of the sides of the keyways. Where the width of the large end of the keyways exceeds the aggregate effective width of these two end sections, one additional broach section or more for taking one or more intermediate cuts may be provided. The additional broach section or sections may be located at any suitable point in advance of the trailing section. Thus, in Figs. 1 to 3, the section 12 is provided to cut away the central stock, and is located in the lead. The broach section 34 in Fig. 9 cuts the intermediate portion of the keyways 32, and is located between the end sections 33 and 35. Hence, the section 34 has a lead greater than that of the section 33 and less than that of the section 35. Excepting for the difference in lead angle, the section 34 is the same in construction as the section 35.

It will be understood that the initial cut need not necessarily define the ultimate form of one side of the keyways as in Fig. 9. In Fig. 2, the initial cut removes the intermediate stock, and subsequently finish cuts are taken on both sides of the preliminary grooves.

The work piece D (see Fig. 10) has keyways 36, each having one side g plane and parallel to the axis, and another side h helicoidal in form with a lead in one direction. A straight broach section 37, the same in construction as the section 12, cuts preliminary straight grooves 38 to define the sides g. Subsequently, a helical broach section 39 is used to cut the opposite sides h with the desired lead. The section 39 is the same in construction as the section 13.

The various broach sections for different work pieces may be connected together as in Figs. 1 to 9, or may be separate as in Fig. 10. It is usually desirable to employ separate broach sections where the sections if combined would result in a broach of objectionable or inconvenient length, as for example where exceptionally long work pieces are to be cut or where a large number of sections are required because of unusual divergence of the sides of the keyways.

A non-cutting pilot member 40 may be provided on the lead end of any broach adapted to enter a preformed groove whether consisting of a single section or a multiple of sections.

The broaching machine and method and the method of making the broach are disclosed and claimed in my copending divisional application Serial No. 269,346, filed April 22, 1939.

I claim as my invention:

1. A metal cutting broach comprising a leading section having a series of aligned longitudinally facing teeth of progressively increasing cutting amplitude and extending generally parallel to the longitudinal axis, and a trailing section having a series of longitudinally facing teeth of progressively increasing cutting amplitude and aligned in a helix about said axis.

2. A metal cutting pull broach comprising a leading section having a longitudinal series of teeth of progressively increasing height and of uniform width throughout their effective height for cutting a straight keyway with parallel sides, and a trailing section having a longitudinal series of teeth for cutting a helicoidal surface on one side of said keyway.

3. A metal cutting broach comprising a leading section having a plurality of series of aligned teeth of progressively increasing cutting amplitude, said series extending generally parallel to the longitudinal axis and being alike in width and uniformly peripherally spaced, and a trailing section having a like number of series of teeth of progressively increasing cutting amplitude and extending helically in one direction about said axis, said last mentioned series being the same in width and spacing as said first mentioned series.

4. A metal cutting broach comprising a leading section having a plurality of transversely spaced generally longitudinal series of aligned teeth for cutting a like number of straight parallel uniformly spaced keyways, and a trailing section having a like number of transversely spaced generally longitudinal series of teeth for cutting one series of corresponding sides of said keyways respectively with helicoidal surfaces having leads of equal degree in a common direction.

5. A metal cutting broach comprising an elongated body, a helical row of generally longitudinally aligned teeth of progressively increasing cutting amplitude on one portion of said body and having a constant lead in one direction, and a helical series of aligned teeth on an adjoining portion of said body and having a constant lead equal in degree to said first mentioned lead but in the other direction.

6. A metal cutting broach comprising an elongated body, a helical series of generally longitudinally aligned narrow teeth on one portion of said body and having a lead in one direction adapted to cut one side of a groove to final form, and a helical series of generally longitudinally aligned narrow teeth on an adjoining portion of said body and having a lead in the other direction adapted to cut the other side of said groove to final form.

7. A metal cutting pull broach comprising an elongated body, a plurality of helical series of generally longitudinally aligned teeth on one portion of said body and having a constant lead in one direction, and a like number of helical series of generally longitudinally aligned teeth on an adjoining portion of said body and having a constant lead equal in degree to said first mentioned lead but in the other direction, said series being uniform in width and uniformly peripherally spaced.

8. A metal cutting broach comprising an elongated body, a helical series of generally longitudinally aligned teeth on said body and having cutting edges at one side, and a guiding surface of uninterrupted contour on the other side of said series of teeth.

9. A metal cutting broach comprising an elongated body, a series of generally longitudinally aligned teeth on said body and having cutting edges at one side, and a noncutting guiding surface on the other side of said series of teeth.

10. A metal cutting broach comprising an elongated body, a helical series of aligned teeth on said body and having cutting edges along one side portion of the top, and a guiding surface of uninterrupted contour and uniform height extending along the other side of said series of teeth, and having a lead the same in degree and direction as said teeth, said teeth varying progressively in stepped height increments from one end of said series to the other.

11. A metal cutting broach comprising an elongated body, a plurality of uniformly peripherally spaced helical series of aligned teeth on said body, and a helical guiding surface on said body and having a lead the same in degree and direction as said series of teeth.

12. A metal cutting broach comprising an elongated body, a plurality of uniformly peripherally spaced series of longitudinally aligned teeth of uniform width and progressively increasing radial height on the lead end of said body and adapted to cut straight parallel keyways; a plurality of series, corresponding in number and spacing to said first mentioned series, of helically aligned teeth on a contiguous following portion of said body and equal in width to said first mentioned teeth and of progressively increasing height on one side and adapted to cut helicoidal surfaces of a predetermined lead in one direction on one series of corresponding sides of said keyways; and a plurality of series, corresponding in number and spacing to said first mentioned series, of teeth on a contiguous portion of said body and helically aligned in a direction opposite to said second mentioned teeth and equal in width thereto and of progressively increasing height on the opposite side and adapted to cut helicoidal surfaces of a lead the same in degree as but opposite in direction to said first lead on the opposed series of sides of said keyways.

13. A metal cutting broach comprising an elongated body, a plurality of spaced series of longitudinally aligned teeth of uniform width and progressively increasing radial height on the lead end of said body and adapted to cut straight parallel keyways; a plurality of series, corresponding in number and spacing to said first mentioned series, of helically aligned teeth on a contiguous following portion of said body and of progressively increasing height on one side and adapted to cut helicoidal surfaces of a predetermined lead in one direction on one series of corresponding sides of said keyways; and a plurality of series, corresponding in number and spacing to said first mentioned series, of teeth on a contiguous portion of said body and helically aligned in a direction opposite to said second mentioned teeth and of progressively increasing height on the opposite side and adapted to cut helicoidal surfaces of a lead opposite in direction to said first lead on the other series of sides of said keyways.

14. A metal cutting broach comprising an elongated body, a helical thread on said body, one side of said thread being of uniform height, smooth and uninterrupted to define a guiding surface, the other side of said thread being interrupted at uniformly spaced points along its length to define teeth separated by chip clearance spaces, said teeth being relieved and varying progressively in cutting amplitude along the thread.

15. A metal cutting broach comprising an elongated body, a helical series of teeth on said body and having a constant lead in one direction, said teeth varying progressively in cutting amplitude, and a guide member on said body and having a helical surface with a lead the same in degree and direction as said first mentioned lead.

16. A metal cutting broach comprising an elongated body, a helical series of generally longitudinally aligned teeth of progressively increasing cutting increment on one portion of said body and having a constant lead in one direction, and a helical series of generally longitudinally aligned teeth of progressively increasing cutting increment on an adjoining portion of said body and having a constant lead unequal in degree to said first mentioned lead and in the other direction.

17. A metal cutting broach comprising an elongated body, a plurality of spaced series of longitudinally aligned teeth of uniform width and progressively increasing radial height on the lead end of said body and adapted to cut straight parallel keyways; a plurality of series, corresponding in number and spacing to said first mentioned series, of helically aligned teeth on a contiguous following portion of said body and of progressively increasing height on one side and adapted to cut helicoidal surfaces of a predetermined lead in one direction on one series of corresponding sides of said keyways; and a plurality of series, corresponding in number and spacing to said first mentioned series, of teeth on a contiguous portion of said body and helically aligned in a direction opposite to said second mentioned teeth and of progressively increasing height on the opposite side and adapted to cut helicoidal surfaces of another predetermined lead unequal in degree and opposite in direction to said first mentioned lead on the other series of sides of said keyways.

18. A metal cutting broach comprising a leading section having a plurality of laterally spaced generally longitudinal series of helically aligned teeth of progressively increasing cutting increment for cutting a like number of helical keyways, and a trailing section having a like number of laterally spaced generally longitudinal series of teeth of progressively increasing cutting increment for cutting one series of corresponding sides of said keyways respectively with heliccoidal surfaces having leads in a direction opposite to the leads of the other series of corresponding sides of said keyways.

19. A metal cutting broach comprising a leading section having a plurality of laterally spaced generally longitudinal series of helically aligned teeth of progressively increasing cutting increment for cutting a like number of helical keyways, and a trailing section having a like number of laterally spaced generally longitudinal series of teeth of progressively increasing cutting increment for cutting one series of corresponding sides of said keyways respectively with helicoidal surfaces having leads unequal in degree to and in a common direction opposite to the opposed series of sides of said keyways.

20. A metal cutting broach comprising, in combination, a leading section having a generally longitudinal series of helically aligned teeth of progressively increasing cutting increment and having a predetermined lead in one direction and adapted to cut at both sides, and a trailing section having a series of helically aligned teeth of progressively increasing cutting increment with a different predetermined lead in the opposite direction and having cutting edges at one side and a guiding surface on the other side.

21. A metal cutting broach comprising two sections for respectively cutting the ultimate form on the sides of a keyway, and a third section for cutting the portion of said keyway intermediate said sides, said sections being connected in a predetermined series, the leading section cutting at both sides to form a preliminary groove, the trailing section cutting only at one side of said groove.

22. A metal cutting broach comprising a leading helical series of aligned longitudinally facing teeth having a constant lead in one direction, and a trailing helical series of aligned teeth having a constant lead greater in degree but in the same direction as said first mentioned lead.

23. A metal cutting broach comprising a leading helical series of aligned teeth having a constant lead in one direction and adapted to cut at both sides to form a preliminary helical groove, an intermediate helical series of aligned teeth having a lead greater in degree but in the same general direction as said first mentioned lead for taking a cut on one side of said groove, and a trailing helical series of aligned teeth having a constant lead greater in degree but in the same direction as said second mentioned lead for taking a second cut on said side of said groove.

24. A metal cutting broach comprising, in combination, an elongated body, two broach sections formed in longitudinally spaced relation on said body and each having a generally longitudinal series of aligned teeth of progressively increasing cutting increment, and a pilot section on said body and interposed between said broach sections.

25. A metal cutting broach comprising an elongated body, a broach section formed on one longitudinal portion of said body and having a generally longitudinal series of aligned teeth with cutting edges at one side, a second broach section formed on another longitudinal portion of said body and having a generally longitudinal series of aligned teeth having cutting edges along a side opposite that of said first mentioned edges, an intermediate pilot section formed on said body between said broach sections, said pilot section being non-cutting on the side of said first mentioned teeth.

26. A metal cutting pull broach comprising, in combination, a longitudinal section having means for cutting a keyway, a second longitudinal section having means trailing said first mentioned means for cutting one side of said keyway to ultimate form, and a third longitudinal section having means trailing said last mentioned means for cutting the other side of said keyway to ultimate form.

JOHN EDGAR.

CERTIFICATE OF CORRECTION.

Patent No. 2,173,901.   September 26, 1939.

JOHN EDGAR.

It is hereby certified that error appears in the printed specification of the above numbered patent requiring correction as follows: Page 1, first column, line 47, for "Fig. 4" read Fig. 3; line 50, for "scetional" read sectional; page 2, first column, line 65, after "only at" insert substantially; page 4, first column, line 10, claim 5, for the words "series of aligned teeth" read row of generally longitudinally aligned teeth of progressively increasing cutting amplitude; and that the said Letters Patent should be read with this correction therein that the same may conform to the record of the case in the Patent Office.

Signed and sealed this 7th day of November, A. D. 1939.

(Seal)   Henry Van Arsdale,
Acting Commissioner of Patents.